UNITED STATES PATENT OFFICE.

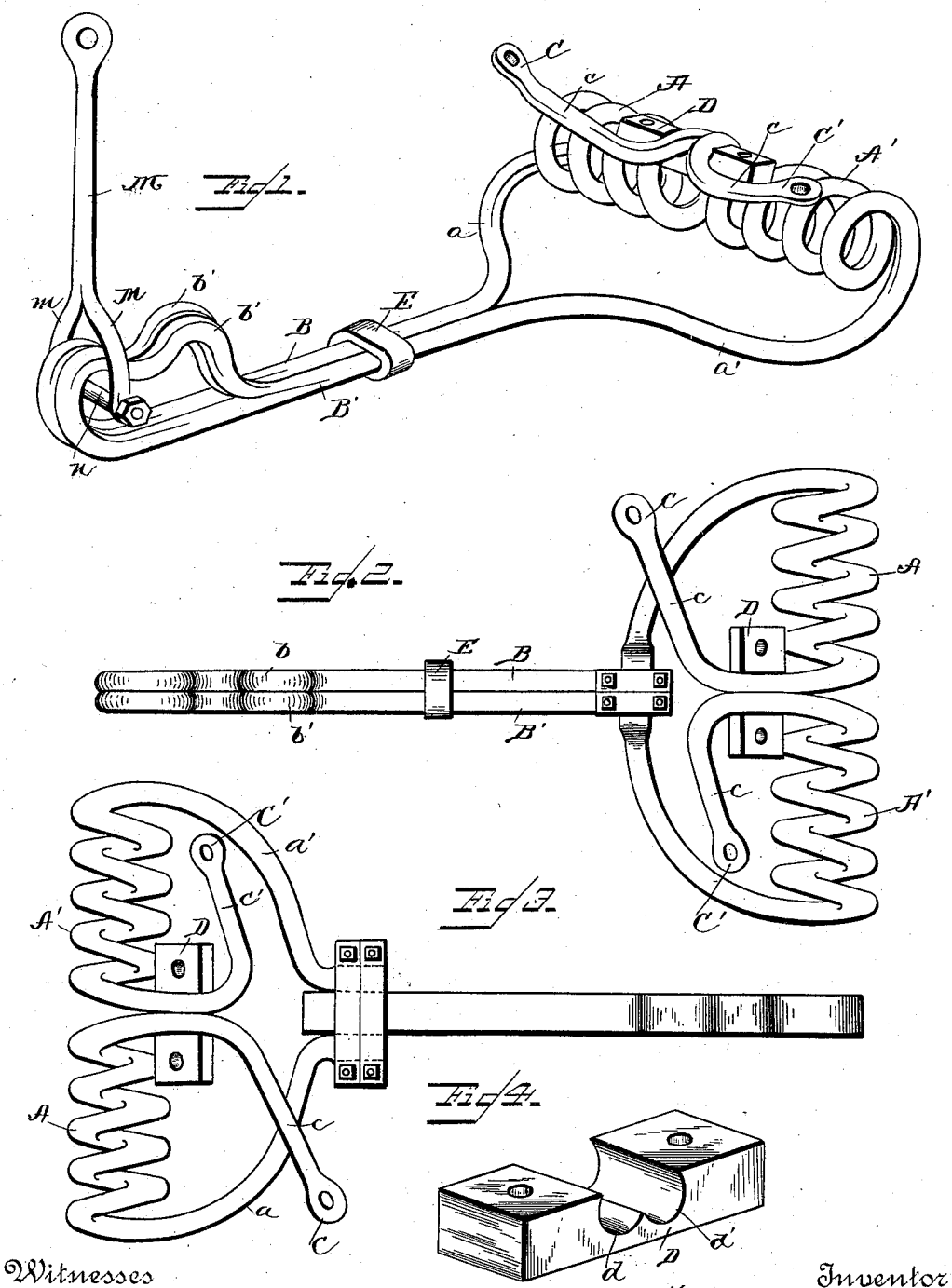

WILLIAM S. BULETT, OF DELTA, PENNSYLVANIA.

VEHICLE-SPRING.

SPECIFICATION forming part of Letters Patent No. 373,171, dated November 15, 1887.

Application filed September 12, 1887. Serial No. 249,492. (No model.)

*To all whom it may concern:*

Be it known that I, WILLIAM S. BULETT, a citizen of the United States, residing at Delta, in the county of York and State of Pennsylvania, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to improvements in vehicle-springs; and it consists in the novel construction and arrangement of parts, as will be hereinafter described, and particularly pointed out in the claims.

In the accompanying drawings, Figure 1 is a perspective view of my improved spring. Fig. 2 is a plan view of a modification. Fig. 3 is a plan view of another modification. Fig. 4 is a detail view of the plate with the rounded bearings.

Referring to the drawings, the letters A A' designate two coiled springs terminating at their outer ends in bent or curved arms $a\ a'$, having extensions B B', which are provided at their outer ends with closed double-ogee bearings $b\ b'$. These springs are also provided with upwardly-extended arms C C', formed out of the inner ends of the coiled springs and bent at right angles to the body portions thereof. These arms are also bent in curve form, as shown at $c\ c'$, Fig. 1.

The letter D represents a plate having rounded bearings $d\ d'$, in which the body portions of the arms C C' are seated and held therein by spring action, said spring action securing the coiled springs together, while the extensions B B' are connected together by means of a clip, E, or I may use more than one clip if necessity requires it.

In Fig. 2 I have shown the coiled springs and the curved bent arms in one piece, having the extensions B B' separate and clamped to the central portions of the curved arms by means of clips, as shown. The extensions B B' and double-ogee bearings, as shown in Fig. 2, may be made separate, or may be made in one piece.

In Fig. 3 I have shown the ends of the curved arms spaced, whereby the inner ends of the extensions B B' may be seated therein and clamped by clips, or I may use other suitable fastening means.

As shown in Fig. 1, the spring is ready to be attached to the vehicle. The arms C C', being bent at right angles and curved, as before stated, are bolted to the main sills or rockers of a vehicle—as, for instance, to a two-wheeled vehicle. A hanger, M, is connected at its upper end to a shaft by means of hooks, or I may use other means for securing the upper end of the hanger. Said hanger is also provided with arms having a bolt-connection, $n$, which are adjustably connected to the bearings $b\ b'$, whereby the said arms can be slipped from one bearing to the other by the shifting of said bolt and arms.

I wish it to be understood that I do not limit myself to the precise construction shown in my drawings and described in my specification, as I may vary the same without departing from my invention or the true spirit and scope thereof.

I further wish it to be understood that I do not limit myself to attaching the spring to the shaft of a vehicle, as I may attach it to any other portion of a vehicle to produce the desired result—as, for instance, I can attach it to an axle of a vehicle, which will produce the same result as attaching it to the shaft.

What I claim, and desire to secure by Letters Patent, is—

1. The coiled springs having curved arms and extensions provided with double-ogee bearings, said springs also provided with upwardly-extended arms bent at right angles to the body of the coils, and a plate having rounded bearings, and said right-angled arms held in said bearings by spring action to secure the coils together, and a clip for securing the extensions together, substantially as described.

2. The coiled springs having formed out of their outer ends curved arms, extensions, and a double-ogee bearing, said springs also provided with upwardly-extended arms formed out of the inner ends of said coils, said arms bent at right angles to the body of said coils, said arms also being curved, as shown, and a plate having rounded bearings, and said arms held in said bearings by spring action to hold the coils together, and a clip for securing the extensions together, as shown and described.

In testimony whereof I affix my signature in presence of two witnesses.

WILLIAM S. BULETT.

Witnesses:
GEO. C. POULTON,
W. R. WILLIAMS.